United States Patent [19]

Thomas

[11] 3,929,499

[45] Dec. 30, 1975

[54] HIGH WATER-CONTENT WATER IN OIL EMULSION

[76] Inventor: Frederick L. Thomas, c/o Thomas Chemical Company, 1021 Walsh Road, Madison, Wis. 53714

[22] Filed: Mar. 8, 1974

[21] Appl. No.: 449,540

Related U.S. Application Data

[63] Continuation-in-part of Ser. No. 287,365, Sept. 8, 1972, which is a continuation-in-part of Ser. No. 116,679, Feb. 18, 1971, abandoned.

[52] U.S. Cl. ........................ 106/268; 106/8; 106/10; 106/38.24; 106/38.25; 106/271
[51] Int. Cl.² ............................................ C08L 91/06
[58] Field of Search ........... 106/8, 10, 11, 268, 271, 106/38.24, 38.25

[56] References Cited
UNITED STATES PATENTS

| | | | |
|---|---|---|---|
| 2,144,642 | 1/1939 | Stoughton et al. | 106/271 |
| 2,829,035 | 4/1959 | Doughty et al. | 106/243 |
| 3,447,935 | 6/1969 | Marley | 106/271 |
| 3,660,128 | 5/1972 | Sheldahl | 106/271 |
| 3,702,769 | 11/1972 | Vaughn | 106/10 |

*Primary Examiner*—Lorenzo B. Hayes
*Attorney, Agent, or Firm*—Keith Schoff

[57] ABSTRACT

A high water-content water in oil emulsion comprising an odorless solvent naphtha, a synthetic wax, a lipophilic surface active agent, and a high water content. It has utility as a cleaning composition. It also indicates utility in other areas as a release agent, dye and pigment carrier and a non-flammable hydraulic fluid.

1 Claim, No Drawings

HIGH WATER-CONTENT WATER IN OIL EMULSION

CROSS REFERENCE TO RELATED APPLICATIONS

This application is a continuation-in-part of my co-pending U.S. application Ser. No. 287,365 filed Sept. 8, 1972 which was a continuation-in-part of my U.S. application Ser. No. 116,679 filed Feb. 18, 1971, now abandoned.

BACKGROUND OF THE INVENTION

1. Field of the Invention

This invention pertains generally to the field of emulsions, and more particularly to a water in oil emulsion.

2. Description of the Prior Art

Asphalt and plastic tiles have attained great popularity as floor coverings. Such tiles are generally secured directly to wooden or concrete floors one at a time with the application of an appropriate adhesive. Two types of adhesive are used for this purpose. One is the "cut back" or solvent type and the other is an "emulsified-in-water" type. Both adhesives, if left on the surface of the tiles, will dry to a gummy resin.

Commercially marketed solvents for removing these adhesives consist of a class of flammable organic compounds. Although these solvents effectively remove the adhesive they also etch or dissolve the tiles. A flammable product is less desirable both in industry and the home because of the fire hazards.

Organic compounds with higher boiling points, such as mineral oil, do not etch tiles. However, high boiling mineral oils have an extremely low evaporation rate which can result in softening the tiles. These solvents also have an undesirable tendency to leave a shiny spot on the tiles.

Nonionic emulsifying (surface active) agents have been found to have little tendency when used alone to dissolve adhesive. They also soften asphalt tiles when exposed to them for a period of twenty-four hours. When organic solvents are added, the etching tendency of the solvent becomes even more pronounced than when the solvent is used alone.

Ionic emulsifiers do not harm the tiles, however they have been found to have only a slight tendency to remove adhesive. When adhesive is removed from the tile mechanically these emulsifiers are effective in holding it in suspension, preventing it from redepositing. A typical example of this is grinding the tile with soap and steel wool. Although effective the process is time consuming, messy and bothersome to professional tile installers. They generally simply remove a freshly smudged tile and replace it with another. Old tiles, stuck to the floor, are softened with a blowtorch and then removed. The smudged tiles are thrown away and wasted because of the nuisance and difficulty of cleaning them.

SUMMARY OF THE INVENTION

The composition is a water in oil emulsion consisting of an odorless solvent naphtha, a synthetic wax, a lipophilic surface active agent, and a high water content.

The high water content water in oil emulsion I have invented is specifically prepared to remove asphalt adhesive from the surface of asphalt and other types of tiles. However, because of its unique physical properties, it appears to have other uses. Some of these are listed as examples in areas which to my knowledge had not employed high water content water in oil type emulsions before my invention.

For example, the dye color known as PALANIL BLUE R (Badisch Analin Soda Fabrik) readily disperses in the emulsion and gives a permanent color to the poly propylene fiber known as POLYCREST SDR-1 (Uniroyal) in the period of time during which the emulsion remains stable at temperatures between 75°–95° C. The shade developed is a deeper blue than that resulting from the use with water-salt or with solvent alone. Although the fibers give a poor crock test, it indicates this emulsion can be a dye or pigment carrier such as in printing pastes.

A steam pressure lock should assist the emulsion in pad dyeing polyester fibers.

Labels and protective paper coatings for acrylate plastics, provided they can be penetrated with water, are softened and loosened by the emulsion without in any way damaging the acrylate plastic.

Vinyl coverings, auto bodies and window glass contaminated with oil and grease are cleaned by this emulsion.

As a mold release agent applied to forms for concrete, the forms are readily separable from set concrete. However, the forms retain a film of cement powder which can be wiped off.

Because it is a viscous, stable (between 32°–80°F) and non-flammable liquid, it is an hydraulic fluid. Such an hydraulic fluid could prove economical in commercial areas using hydraulic fluid in said temperature range.

The solvent property in the emulsion part of my high water content water in oil emulsion is in no way diminished by incorporation into an aerosal spray.

Further objects, features and advantages will be apparent from the following more detailed description of a preferred embodiment.

DESCRIPTION OF A PREFERRED EMBODIMENT

My composition is composed of four essential components all of which interact in a particular way to achieve the desired result. These components are a solvent, a nonionic emulsifier, water and a synthetic wax.

The solvent component is selected from a group of hydrocarbon solvents known as odorless solvent naphthas. The exact composition of these solvents is not usually determined because it is not essential for most practical purposes. These solvents are therefore, generally described by a manufacturing process. For example, U.S. Pat. No. 2,756,185 discloses a process of manufacture in which the petroleum products or a selected fraction of those products having boiling points within the range of about 160°–220° C are alkylated in the presence of a catalyst. The exact characteristics of the product solvent will depend upon which fraction or fractions of products within the boiling range are used.

The essential characteristic, exhibited by all these alkylated petroleum products, is that they have little or no aromatic hydrocarbon content. Aromatic hydrocarbons even in relatively small quantities seem to cause the composition to attack tiling. A secondary characteristic of the odorless solvents is that they have been found to have superior solvent properties as applied to tile adhesive.

Commercially these solvents are available under the name of odorless mineral spirits or other title indicating that it is an odorless solvent. It should be noted that the title odorless does not indicate a deodorized solvent. Rather, it refers to the absence of aromatic hydrocarbons due to the process of manufacture such as the above described process of U.S. Pat. No. 2,756,185. The odorless alkylates having a boiling point around 200° C are preferred because of their rate of evaporation.

The nonionic emulsifier component must be lipophilic in nature. A lipophilic emulsifier is one that forms a water in oil type of emulsion. It is characterized as having a relatively low HLB (Hydrophile-Lipophile Balance) number. The HLB scale is an arbitrary listing set up to measure the hydrophili-lipophile balance of a given compound and is well known in the art of nonionic emulsifiers.

The emulsifier must be within the range of about HLB 2.0-HLB 6.0. This value can be obtained by using a single emulsifier that falls within this range or a combination of emulsifiers having the same or different HLB numbers may be used. Since the HLB values for different emulsifiers add algebraically the value for a resultant emulsifier may be quickly computed. It should be noted that two emulsifiers both having HLB values outside the desired range may, when combined, have a resultant HLB value within the range.

Two types of emulsifiers have been found to be ideal as a component in my composition. The first are the sorbitan esters of saturated and unsaturated fatty acids. The HLB values for these emulsifiers range between about 1.8 to about 8.6. A satisfactory emulsifier can be made up from the compounds at the extremes. For example, sorbitan monolaurate (HLB 8.6) and sorbitan trioleate (HLB 1.8) may be mixed together in linear proportions by weight to give an HLB between 3.0–5.2. A satisfactory emulsifier also exists in the form of sorbitan monostearate alone which has an HLB in the range of 4.7–5.9. Other combinations of the sorbitan esters work equally well.

The second emulsifier and the preferred one is the condensation product of diethenolamine with oleic acid. The HLB of this emulsifier has been indicated to be about HLB 3.0. This emulsifier is preferred because it seems to give a much longer shelf life for the composition than do the sorbitan esters. For example, a shelf life of four years has been obtained using the condensation product. Both emulsifiers otherwise yield a highly effective emulsion for the purposes of the composition. As an example of this second and preferred emulsifier, I have used Solar F-221, a product of Swift & Company, which is an unmodified fatty alkanolamide prepared by the condensation of oleic acid and diethanolamine. The analytical specifications of Solar F-221 are: Amine soap-less than 5 milliquivalents per 100 grams; Free amine-65 to 85 milliquivalents per 100 grams. It is 100% active dark amber liquid with a pour point of 10°F.

Suitable emulsifiers are also obtained by combining the emulsifier composed of the sorbitan esters with the emulsifier formed by the condensation of diethenolamine with oleic acid. In this respect any combinations of the two between 0–100% of one and 100–0% of the other is quite acceptable. It was found that an approximate 50—50% combination produced an excellent emulsion and a satisfactory shelf life.

Water is the bulk component of my composition. Although distilled water is preferred for use in the composition, it is not essential. Hard tap water has the disadvantage of increasing the incidence of saponification of any esters in the composition. However, it has been found as noted above that an acceptable shelf life is obtained using ordinary tap water notwithstanding this minor defect.

In the water in oil emulsion, the dispersing by vigorous agitation of the discontinuous water phase results in the important effect that the hydrocarbon coating on the water droplets is very thin. The thin coating gives the desirable result of undiminished speed in loosening and dispersing the asphalt adhesive yet preventing the hydrocarbon film from dissolving the surface of the sensitive asphalt tile.

To obtain the high water content, the water must be dispersed by vigorous agitation at a temperature below about 60° C.

Dispersing and blending are terms used interchangeably in the emulsion literature. (Reference: The Atlas HLB System, Atlas Chemical Industries, 4th printing, page 8: W/O emulsions do not dilute readily with water. W/O emulsions are easily water dispersable). In the O/W emulsions are easily water dispersable). In the above cited reference, the authors are pointing out one of the methods of detecting which of the two types of emulsions, water in oil or oil in water, one is analyzing. The last term in the emulsion designation is the continuous phase. Addition of small amounts of the continuous phase will incorporate in emulsions with mild stirring. Addition to the dispersed or discontinuous phase requires agitation.

The above distinction has several important results. First and foremost it has been found that a high water content is essential to prevent attack by the composition on the tiles. Second, water is an extremely inexpensive carrier for the active ingredients. Also it does not reduce the solvent properties of the composition when the percentage of water is increased above 79 percent. A final result is that the high water content renders the composition non-flammable. Even in the presence of a hot propane flame the composition will not support sustained combustion.

The final component is a synthetic wax. This component need be present in only minor proportions. The wax incorporates and disperses the adhesive and prevents the latter from redepositing on the surface of the tile. If the wax is not present in at least small quantities, it was found that the composition would soften and attack the tiles. Parafin waxes and natural waxes exhibit an undesirable tallowy or greasy property that if present would cause softening of tiles and redeposit of the tile adhesive on the surface of the tiles.

Two synthetic waxes have been found that blend into my composition and exhibit the desired property. One is a compound known as N, N' Distearoylethylene diamine. This wax melts at about 139°–141° C. The other is the product of hydrogenation or selected hydrogenation of castor oil having a melting point of about 84°–86° C. The latter waxes are preferred because they are easier to blend into the composition. The former waxes on the other hand do not saponify and are therefore more stable. Both, however, produce excellent results.

Methods of preparing emulsions are well known in the art and need not be discussed in detail in order to understand this invention. One excellent method of preparation is to first combine the emulsifier consisting of sorbitan esters of fatty acids, the synthetic wax such as N, N''Distearoylethylene diamine and a portion of the solvent in a metal container. The mixture is stirred at a temperature of around 115° C until it melts to a sludge. The sludge is transferred to a large porcelain container along with the remainder of the solvent. Enough 60° C water is added to form a paste. The resulting composition will be concentrated and can be shipped in bulk in this state to reduce freight costs. The remainder of the water may be added at any time with careful heating below 60° C and agitating to bring the emulsion to the desired dilution.

A satisfactory range of components has been determined experimentally. High percentages and low percentages were determined for each component and the resulting compositions were tested for effectiveness, damage to tiles and non-combustibility. It was found that about 7.0–15.0% by weight solvent, about 0.25–3.0% by weight of emulsifier, about 0.3–3.0% by weight of wax and about 79.0–92.45% by weight water constituted the range of acceptable compositions.

In use as a tile adhesive remover, the composition is dispensed onto a smudged tile in sufficient quantity to lightly cover the smudged area. The composition can be immediately wiped off and the tile will be clean. Tile adhesive that has been allowed to stand and to dry out on the tile over a relatively long period of time may require two applications to fully remove it. Alternatively, the composition may be allowed to remain on the tile for several seconds before it is wiped off. In either case the tile will be cleaned without being etched, softened or otherwise damaged.

Although the foregoing description of the preferred embodiment is necessarily of a detailed character in order that the invention may be completely set forth, it is understood that my invention embraces all such modified forms thereof as come within the scope of the following claim.

I claim:

1. A water in oil emulsion consisting essentially of:
   a. about 7.0–15.0% by weight of odorless mineral spirits having a boiling point between about 160° C. and 220° C.;
   b. about 0.25–3.0% by weight of a surface active agent comprising principally alkanolamide formed as the condensation product of diethanolamine and oleic acid and having an HLB number between about 2.0 – 6.0;
   c. about 0.3–3.0% by weight of a synthetic wax selected from the group consisting of the hydrogenation product of castor oil and N, N' distearoylethylene diamine having a melting point of about 139°–141° C.; and
   d. about 79.0–92.45% by weight of water.

* * * * *